W. De SANNO.
BORING-MACHINE.
No. 182,902.       Patented Oct. 3, 1876.
Fig: 1.
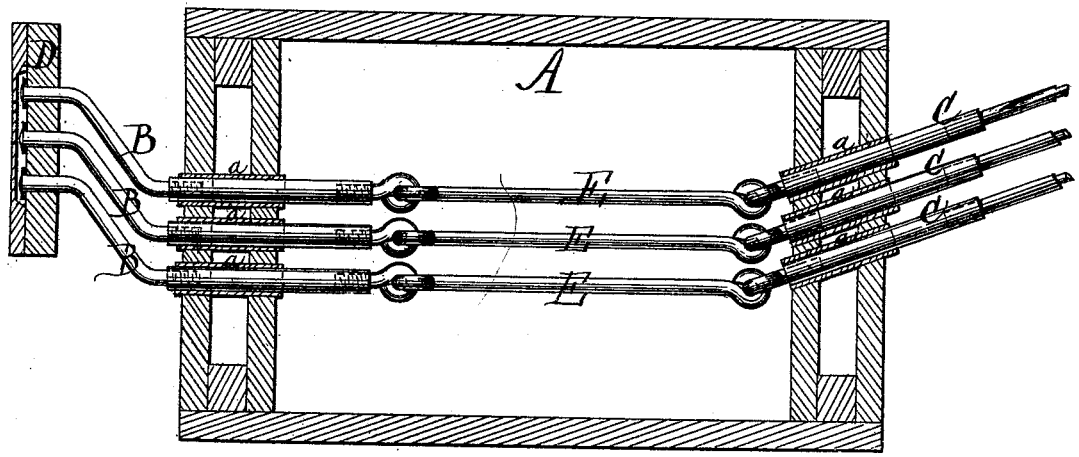
Fig: 2.
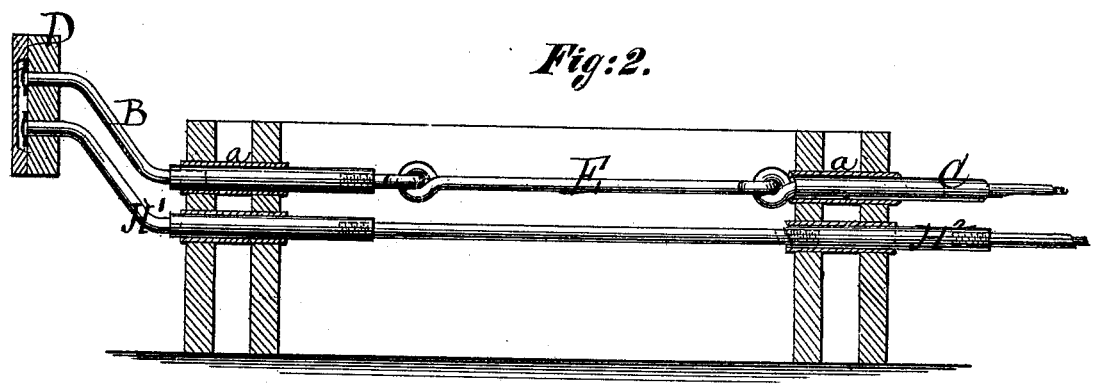
Witnesses:
Henry Eichling
Pier Hayne
W. De Sanno
by his Attorneys
Brown & Allen

UNITED STATES PATENT OFFICE.

WALTER DE SANNO, OF CORRY, PENNSYLVANIA, ASSIGNOR TO FRANK S. ALLEN, OF NEW YORK, N. Y.

IMPROVEMENT IN BORING-MACHINES.

Specification forming part of Letters Patent No. 182,902, dated October 3, 1876; application filed March 26, 1874.

*To all whom it may concern:*

Be it known that I, WALTER DE SANNO, of Corry, in the county of Erie and State of Pennsylvania, have invented an Improvement in Serial Crank - Motion, of which the following is a specification:

My invention relates to certain improvements on that for which Letters Patent No. 80,769 were granted to Charles F. Ritchel, under date of August 4, 1868.

The invention consists in the combination, with a series of simultaneously - revolving crank-shafts, of a series of universal-jointed connecting links or rods and drill - stocks or other spindles, the latter being arranged obliquely to the axis of revolution of the crank-shafts.

In the accompanying drawing, Figure 1 is a horizontal section of my invention. Fig. 2 is a longitudinal vertical section.

A represents a frame, in which the crank-shafts B and drill-stocks C are journaled in boxes $a$, the crank-shafts being at one end of the frame and the drill-stocks at the opposite end. The crank-shafts are arranged to revolve on parallel axes, and their outer ends are journaled in a plate or block, D, with which engages a crank-shaft, by which it is revolved and motion is imparted simultaneously to the crank-shafts B. The drill-stocks C are arranged to revolve obliquely to the axes of revolution of the crank-shafts B, the angle of inclination being adjusted to correspond with the direction in which the holes are to be drilled in the work. The inner or rear ends of the drill-stocks are connected with the inner ends of the crank - shafts by means of connecting links or rods E, having eyes at their ends engaging with corresponding eyes in the ends of said shafts and drill-stocks, thus forming a universal-joint connection, so that rotary motion is communicated to the drill-stocks or spindles by the revolution of the crank - shafts, without the necessity for the axes of the former being parallel with those of the latter, as in the lower series of cranks and spindles $H^1$ $H^2$, (shown in Fig. 2,) which are substantially the same as those shown in the patent of Ritchel aforesaid.

What I claim as new, and desire to secure by Letters Patent, is—

The journals $a$ of the drill-stocks C, located in the frame A obliquely to the connecting-links E and the bearings of the crank - shafts B, all in the described combination herein shown, for the purpose specified.

WALTER DE SANNO.

Witnesses:
S. H. HOLLISTER,
H. D. CLEMONS.